United States Patent [19]

Schoer et al.

[11] Patent Number: 4,905,887

[45] Date of Patent: * Mar. 6, 1990

[54] PROCESS FOR SOLDERING ALUMINUM CONTAINING WORKPIECES

[76] Inventors: Heinz Schoer, Alfter; Werner Schultze, Bonn, both of Fed. Rep. of Germany

[ * ] Notice: The portion of the term of this patent subsequent to Oct. 24, 1995 has been disclaimed.

[21] Appl. No.: 661,281

[22] Filed: Oct. 16, 1984

Related U.S. Application Data

[63] Continuation of Ser. No. 373,535, Apr. 30, 1982, abandoned, which is a continuation of Ser. No. 221,274, Dec. 30, 1980, abandoned, which is a continuation of Ser. No. 933,477, Aug. 14, 1978, abandoned, which is a continuation of Ser. No. 729,039, Oct. 4, 1976, Pat. No. 4,121,750, which is a continuation of Ser. No. 368,627, Jun. 11, 1973, abandoned, which is a continuation-in-part of Ser. No. 98,173, Dec. 14, 1970, abandoned.

[30] Foreign Application Priority Data

Dec. 15, 1969 [DE] Fed. Rep. of Germany ....... 1962760
Jun. 11, 1970 [DE] Fed. Rep. of Germany ....... 2028683

[51] Int. Cl.$^4$ .............................................. B23K 35/28
[52] U.S. Cl. .................................... 228/217; 228/219; 228/263.17
[58] Field of Search ................... 228/263.17, 217, 219, 228/221

[56] References Cited

U.S. PATENT DOCUMENTS

| | | |
|---|---|---|
| 1,453,928 | 5/1923 | Edwards ............................ 420/548 |
| 2,943,181 | 6/1960 | Gunow . |
| 3,081,534 | 3/1963 | Bredzs . |
| 3,321,828 | 5/1967 | Miller . |
| 3,322,517 | 5/1967 | Miller . |
| 3,355,281 | 11/1967 | Hansley . |
| 3,373,482 | 3/1968 | Miller . |
| 3,373,483 | 3/1968 | Miller . |
| 3,375,570 | 4/1968 | Dubusker . |
| 3,378,914 | 4/1968 | Miller . |
| 3,395,001 | 7/1968 | Stroup . |
| 3,415,697 | 12/1968 | Bredzs . |
| 3,460,816 | 8/1969 | Miller . |
| 3,482,305 | 12/1969 | Dockus . |
| 3,673,678 | 7/1972 | Moreau . |
| 3,782,989 | 1/1974 | Werner . |
| 3,811,177 | 5/1975 | Schoer et al. ................... 228/263.17 |
| 4,173,302 | 11/1979 | Schultz et al. ................... 228/263 F |

FOREIGN PATENT DOCUMENTS

| | | |
|---|---|---|
| 198585 | 7/1958 | Austria . |
| 66398 | 1/1893 | Fed. Rep. of Germany . |
| 64857 | 9/1982 | Fed. Rep. of Germany . |
| 839765 | 4/1939 | France . |
| 859733 | 12/1940 | France . |
| 1494315 | 7/1967 | France ............................ 228/263 F |
| 509977 | 1/1955 | Italy . |
| 421439 | 12/1934 | United Kingdom . |
| 747813 | 4/1956 | United Kingdom . |
| 1022081 | 1/1958 | United Kingdom . |

OTHER PUBLICATIONS

*Metals Handbook*, vol. 6, 8th ed., pp. 675–684.
Schwartz, *Modern Metals*, May 1969, pp. 81–82, 84, 86.
Table 2 from "Resistance of Aluminum Alloys to Corrosion"; *Metals Handbook*; vol. 8, Amer. Soc. Metals, 1961, p. 917.
Schoer & Schultz, Zeitschrift für Metalkunde (Journal of Metallography) vol. 63, part 12, pp. 775–781; 12/1972.
Material Progress—Metal Progress News Supplement, p. 7, col. 3; 2/1971.
Korolkow, Surface Tension of Aluminum and the Aluminum Alloys—Reports of the Academy of Sciences of the USSR, Section of the Technical Sciences, No. 2; 1956.
Kubichek, The Effect of Some Elements on the Surface Tension of Aluminum Alloys; Reports of the Academy of Sciences of the USSR, Div. of Technical Sciences, Metallurgy & Fuel; 1958.
Wassink, Wetting of Solid Metal Surfaces of Molten Metals; Journal of the Institute of Metals, vol. 95, pp. 28–43.
Terrill et al., Welding Journal, p. 833; 12/1971.
Von O. R. Singleton, Aluminum, vol. 47, p. 384; 1971.

*Primary Examiner*—Kenneth J. Ramsey
*Attorney, Agent, or Firm*—Darby & Darby

[57] ABSTRACT

Processes and composition for soldering aluminum-containing workpieces wherein the solder contains components which lower the surface tension and the viscosity of the molten solder, and which lower the interfacial tension between the solder and the aluminum-containing workpieces. Useful components are bismuth, strotium, barium and antimony. The solder may be used with or without flux.

18 Claims, No Drawings

PROCESS FOR SOLDERING ALUMINUM CONTAINING WORKPIECES

CROSS REFERENCE TO RELATED APPLICATIONS

This application is a continuation of application Ser. No. 373,535, filed Apr. 30, 1982, now abandoned, which is a continuation of application Ser. No. 221,274, filed Dec. 30, 1980, now abandoned, which is a continuation of application Ser. No. 933,477, filed Aug. 14, 1978, now abandoned, which is a continuation of application Ser. No. 729,039, filed Oct. 4, 1976, now U.S. Pat. No. 4,121,750, which is a continuation of application Ser. No. 368,627, filed June 11, 1973, now abandoned, which is a continuation-in-part of application Ser. No. 98,173, filed Dec. 14, 1970, now abandoned.

BACKGROUND OF THE INVENTION

In the soldering process, is contrast to what happens during welding, the added metal must melt, but the workpiece itself must not melt. For this reason, the melting region of the solder and the work temperature must lie beneath the melting point of the workpiece. The term "soldering" is commonly used to refer to processes for joining together metal surfaces with an alloy which may be a soft or a hard solder, and the term is used herein in this broad sense. When a hard solder is used, the process, which is generally carried out at a temperature above 450° C., is also referred to and known as brasing and the hard solder is referred to as a brasing alloy. Soft or common solder is used at temperatures below 450° C. and hard solder is relatively infusible as compared with soft solder.

In the soldering of aluminum and aluminum alloys, a serious problem exists by reason of the fact that a very resistant layer of oxide is present on the surface and prevents the molten solder from wetting the metal therebeneath. Although this oxide layer is very thin, it is nevertheless dense and stable, and after removal, a new film reforms spontaneously, even during the soldering process, so long as the operation is carried out in an oxidizing atmosphere such as air. It has hitherto been necessary for the soldering of aluminum-containing workpieces to remove the oxide layer from the region where the soldering is to take place, either by mechanical or by chemical means. One such method has been friction soldering, a special technique in which soft solder is applied and the oxide layer removed together with the molten solder. In a variation of this technique, supersonic soldering has been attempted but such technique has not come into common use.

Apart from such special processes, the removal of the oxide layer has been carried out by means of fluxes which, in addition, proves the formation of a new oxide layer. The fluxes suitable for use in the soldering of aluminum, in general, are chlorides or fluorides and, for soft soldering, pure organic compounds are also used. All fluxes have the disadvantage that they lead to corrosion, most leading to very strong corrosion, and consequently residues must be completely removed. However, there is always the danger of inclusion of flux in the solder joint. Residues and inclusions of flux damage the corrosion resistance of the solder portion, especially when dampness has access to the soldered joint. Removal of solder residues is costly and consequently is generally not complete. It is for such reason that research has been directed to solders and especially hard solders which can operate without fluxes.

The difficulties described above become especially significant when the standards of strength and corrosion resistance for a soldered joint are considered. Solders previously used for soldering aluminum without flux have consequently not matured to actual practice or commercial production. As examples of processes that have been proposed in United States patents and publications, it has been recommended that the oxide layer be removed either through exothermic reaction or by reduction at the location where the joint is to be made, and this be carried out either in a high vacuum at an absolute pressure of about $10^{-6}$ torr, or with a combination of a reduction process in a vacuum at as absolute pressure of about $10^{-4}$ torr. In such processes, the solder, as well as any additional components, are generally added in the form of a mixture of powder.

In addition to the very dubious efficiency of the removal of oxide by the foregoing methods, these methods also have the disadvantages that the powders must be protected from oxidation during their preparation and stratification of the components must be prevented when the powder is applied to the workpiece, making such processes unsuitable for quantity production of aluminum workpieces. Also, large-scale use of high vacuum for soldering requires high costs for preparation and operation. Consequently, such processes can be used in only very special cases, such as for the manufacture of parts to be used with reactors or rockets.

As a general rule, the solders used for soldering aluminum-containing workpieces have the disadvantage of relatively high viscosity and surface tension, as well as poor wetting characteristics. This is particularly true for hard solders which, as stated above, have special significance. Such hard solders are usually of the aluminum-silicon (Al-Sl) type which may also contain copper (Cu), magnesium (Mg), nickel (Ni), zinc (Zn), tin (Sn) and cadmium (Cd). In addition to the commercial soft solders, there are zinc-aluminum (Zn-Al) solders which, according to the particular compositions and thereby the operating temperature, can be rated either as hard or soft solders.

In order to avoid the difficulties of high viscosity and high surface tension, the flux contains in part additives in the form of zinc salts which produce a metal layer on the clean basic metal surface and increase the wetting by the solder at the point of joining.

A method for the preparation of solder to be used for soldering pure aluminum or nearly pure aluminum was disclosed in German patent No. 66,398, in which a substantial portion of the pure aluminum was melted and then the surface of the molten metal was covered with a layer of phosphoric acid, sodium bisulfate, fluorine compounds, or other acidic salts, and finally, to the molten metal was added a small quantity of copper and tin; or copper bismuth, zinc and tin; or copper, antimony, bismuth and zinc; or copper, bismuth, antimony and tin. Although this patent was issued in 1891, this process has never come into use. Such a solder would not be practical owing to the small difference in temperature between the melting point of the solder and of the workpiece, and the only reason why it was considered at all, was due to the fact that the melting point of aluminum was thought to be 800° C. at that time (page 1, left-hand column, paragraph 2 of that patent), when it is actually 659.7° C.

As was stated above, the fundamental problem in the soldering of aluminum lies in the fact that the workpiece is always covered with a skin of aluminum oxide which is only poorly wetted by the molten solder. It was therefore previously concluded that, for the achievement of satisfactory soldered joints on aluminum-containing workpieces, the oxide skin must be broken down and removed.

SUMMARY OF THE INVENTION

In contrast to the view previously adopted with respect to the problem of soldering aluminum-containing workpieces, we have found that the wettability of the region to be soldered can be greatly improved by the addition of metallic elements other than those which have been previously used in solders for this purpose, which added elements reduce the viscosity and the surface tension of the molten solder and similarly reduce the interfacial tension between the molten solder and the workpiece.

DESCRIPTION OF THE PREFERRED EMBODIMENTS

Our researches have shown that a strong reduction of the viscosity and the surface tension of the molten solder, as well as of the interfacial tension between the molten solder and the workpiece, can be achieved by the addition of bismuth and/or strontium and/or barium and/or antimony is equantities of 0.01 to 10%, and preferably 0.05 to 2%, where these materials are free of either silicon or of the highest purity aluminum. However, it is also possible to prepare a suitable solder which contains at least 6% silicon as well as bismuth and/or strontium and/or barium and/or antimony in quantities of 0.01 to 10%, and preferably 0.05 to 2%.

Suitable solders for use in the soldering processes of the present invention may be of the following alloy types:

(a) Between 2 and 20% by weight of aluminum with the remainder being zinc;

(b) Between 6 and 20% by weight of slicon, with optionally various quantities of other alloying elements such as copper, magnesium, nickel, zinc, tin, and cadmium with the remainder being aluminum.

(c) Between 26 and 45% by weight of aluminum, and optionally up to 1% by weight of manganese, with the remainder being zinc.

Solders of all three of the foregoing types may, and preferably will, contain between 0.01 and 10% by weight of at least one of the metals of the group consisting of bismuth, strontium, barium, and antimony, as hereinbefore stated.

Solders of type a are soft solders whereas solders of types b and c are hard solders. Specific examples of solder compositions of each of these types are indicated in the Examples hereinafter.

We have discovered that solders such as are disclosed herein are suitable for use in fluxless soldering of aluminum when such soldering is carried out in a monoxidising atmosphere, or in an atmosphere containing only a small proportion of oxygen. A suitable method is to use an inert solder-blanketing gas such as argon of welding grade, nitrogen of commercial purity, or ammonia. Another method is to work in a low vacuum having for instance an absolute pressure of between $10^{-1}$ and 10 torr. Vacua in the range of absolute pressures between $10^{-1}$ and $10^{-6}$ torr as have been proposed for previously described methods of fluxless soldering, are definitely unnecessary for the processes of the present invention. More than the conventional precautions, such as the careful cleaning and drying of the area, which have hitherto been necessary, are not required in the soldering processes of the present invention. As with fluxless solders, the present process has the advantage that acid treatment to remove flux residues is not necessary.

The above-described reduction of the surface tension and viscosity, and the thereby improved wetting properties are also, naturally, as advantage when the soldering is carried out with an added flux. The addition of special materials to the flux to improve its wetting properties can be omitted when the solders described herein are used. Moreover, the composition of the flux can be altered in such a way that advantages are achieved in the removal of the flux residues. Solders having the compositions specified herein can be prepared and used in all of the conventionally used forms, such as wires, bars, shaped pieces, foils and plates.

Examples of typical soldering compositions which can be used in the processes in accordance with the present invention are the following:

| EXAMPLE 1 | |
|---|---|
| Si | 11.7% |
| Mn | 0.09% |
| Mg | 0.08% |
| Fe | 0.39% |
| Ti | 0.02% |
| Cu | 0.02% |
| Zn | 0.05% |
| Bi | 0.15% |
| Reminder aluminum | |

| EXAMPLE 2 | | EXAMPLE 3 | |
|---|---|---|---|
| Si | 12.3% | Si | 7.2% |
| Mn | 0.07% | Mn | 0.07% |
| Mg | 0.02% | Mg | 0.03% |
| Fe | 0.25% | Fe | 0.63% |
| Ti | 0.01% | Ti | 0.04% |
| Cu | 0.01% | Cu | 0.18% |
| Zn | 0.04% | Zn | 0.11% |
| Bi | 0.50% | Bi | 1.95% |
| Sb | 0.31% | Remainder aluminum | |
| Remainder aluminum | | | |

| EXAMPLE 4 | | EXAMPLE 5 | |
|---|---|---|---|
| Si | 8.1% | Si | 15.8% |
| Mn | 0.08% | Mn | 0.08% |
| Mg | 0.02% | Mg | 0.04% |
| Fe | 0.49% | Fe | 0.41% |
| Ti | 0.02% | Ti | 0.03% |
| Cu | 0.13% | Cu | 0.11% |
| Zn | 0.09% | Zn | 0.10% |
| Sb | 8.13% | Sb | 1.11% |
| Sr | 0.78% | Ba | 1.37% |
| Remainder aluminum | | Remainder aluminum | |

| EXAMPLE 6 | | EXAMPLE 7 | |
|---|---|---|---|
| Bl | 16.5% | Zn | 95.70% |
| Mn | 0.03% | Al | 3.95% |
| Mg | 0.03% | Bi | 0.34% |
| Fe | 0.43% | Impurities 0.01% | |
| Ti | 0.03% | | |
| Cu | 0.13% | | |
| Zn | 0.17% | | |
| Ba | 1.78% | | |
| Remainder aluminum | | | |

| EXAMPLE 8 | | EXAMPLE 9 | |
|---|---|---|---|
| Zn | 94.23% | Zn | 67.59% |
| Al | 5.10% | Al | 30.40% |
| Bi | 0.18% | Sb | 1.50% |
| Ba | 0.47% | Mn | 0.35% |
| Impurities 0.02% | | Impurities 0.10% | |

-continued

EXAMPLE 10

| Zn | 68.10% |
|---|---|
| Al | 28.73% |
| Sr | 2.67% |
| Mn | 0.33% |
| Impurities 0.08% | |

It will be noted that the compositions of Examples 7 and 8 are soft solders of type a.

The solders whose compositions are specified in the foregoing examples were used for soldering pure aluminum and aluminum-manganese sheets. The samples were heated in an electrically heated oven. In all cases, soldering of aluminum workpieces was carried out without fluxes in a protective gas atmosphere with a gas such as argon or nitrogen. The soldering temperatures for the hard aluminum-silicon solders are between 590° and 605° C., for the zinc-aluminum hard solders (type c) between 530° and 545° C., and for the zinc-aluminum soft solders (type a) are between 400° and 415° C. The soldering time amounted to about 2 minutes. In all cases, satisfactory soldered joints were achieved.

In contrast thereto, attempts to prepare soldered joints with aluminum-containing workpieces using the commercial solders L-AlSi 12 and ZnAl 4 failed when no flux was used. The composition of the L-AlSi 12 solder in percentages by weight is as follows:

| Si | 11–13.5 |
|---|---|
| Mn | 0.1 |
| Fe | 0.4 |
| Ti | 0.08 |
| Cu | 0.08 |
| Zn | 0.07 |
| Other individual components 0.03 | |
| Total of other components 0.05 | |
| Al remainder | |

The composition of the ZnAl 4 solder in percentages by weight is as follows:

| Al | 3.9 |
|---|---|
| Impurities | 0.04 (Cu, Mg, Si, Fe, B, Cd, Pb) |
| Zn | remainder |

Both solders were produced by Vereinigte Aluminimum-Werke Aktiengesellschaft, Bonn.

Vibration of the sample during the soldering process did not improve the results.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of joining aluminum workpieces bearing an aluminum oxide surface layer which comprises:
    interposing between said workpieces an aluminum silicon filler metal comprising aluminum, from 6–20% by weight of silicon and from 0.01 to 10% by weight of bismuth; and
    heating said workpieces in contact with said filler material until said filler material has reached a molten condition wherein the resulting viscosity and surface tension of said filler material in said molten condition is less than the viscosity and surface tension of said filler material in the absence of bismuth, said heating step being performed in a substantially nonoxidizing atmosphere and in the absence of a flux.

2. A method as defined in claim 1 wherein said filler material comprises from about 0.5 to about 2% by weight bismuth.

3. A method as defined in claim 1 wherein said substantially non-oxidizing atmosphere comprises an inert solder blanketing gas.

4. A method as defined in claim 3 wherein said filler metal contains about 0.05 to 2% by weight of bismuth.

5. The method as defined in claim 3 wherein said inert gas is nitrogen.

6. In the method of joining aluminum workpieces which comprises heating in contact with said workpieces an aluminum silicon filler metal of a normal viscosity and wettability in the molten condition, the improvement which comprises:
    heating in contact with said aluminum workpieces a filler metal comprising aluminum, 6–20% by weight of said filler metal of silicon and at least about 0.01% by weight of bismuth to make the normal viscosity of said filler metal in the molten condition lower than the viscosity of said molten filler metal in the absence of bismuth and to improve the wettability of said filler metal, and
    raising the temperature of said filler metal in a substantially non-oxidizing atmosphere including at least one solder blanketing inert gas until said filler metal has reached the molten state, said temperature raising step being performed in the absence of a flux and said temperature being raised to a maximum temperature substantially below the melting point of said aluminum workpieces.

7. The method of claim 6 wherein said inert gas is nitrogen.

8. The method of joining aluminum workpieces bearing an oxide surface layer which comprises:
    interposing between said workpieces a filler metal comprising aluminum, from 6–20% by weight of silicon and from about 0.01 to 10% by weight bismuth, and
    heating said workpieces in contact with said filler metal to a temperature at which said filler metal is molten, said temperature being substantially below the melting point of aluminum, said heating step being performed in a substantially non-oxidizing atmosphere and in the absence of a flux.

9. A method as defined in claim 8 wherein said filler metal contains about 0.05 to 2% by weight of bismuth.

10. A method of joining aluminum workpieces which comprises:
    interposing between said workpieces and in contact therewith an aluminum silicon base filler metal containing at least about 0.01% bismuth to improve the wettability of said molten filler metal,
    maintaining said workpieces and said filler metal in a substantially non-oxidizing atmosphere, and
    raising the temperature of said filler metal in said substantially non-oxidizing atmosphere until said filler metal has reached a molten state, said temperature being raised in the absence of a flux and at a temperature substantially below the melting point of aluminum.

11. The method as defined in claim 10 which comprises raising the temperature of said filler metal to between about 590° C. and about 605° C.

12. The method according to claim 10 wherein said substantially non-oxidizing atmosphere is a vacuum having an absolute pressure between about $10^{-1}$ tor and 10 tor.

13. The method as defined in claim 12 wherein said filler metal contains from about 6 to about 20% by weight of silicon.

14. In the method of soldering two aluminum containing workpieces together in a vacuum without a flux, using a brazing composition comprising aluminum and from about 6 to about 20% by weight of silicon, the improvement which comprises adding to said brazing composition a sufficient quantity of bismuth to reduce substantially the vacuum required to join said workpieces by brazing in a substantially non-oxidizing atmosphere.

15. The method defined in claim 14 wherein said quantity comprises between about 0.05 and about 2% bismuth.

16. In a process of soldering aluminum containing workpieces, the improvement which comprises the steps of soldering said workpieces with a solder consisting essentially of aluminum, from 6–20% by weight of said solder of silicon and from about 0.01 to 10% by weight of said solder of at least one substance selected from the group consisting of Bi, Sr, Ba and Sb, said substance lowering the viscosity and surface tension of said solder in its molten state and substantially decreasing the interfacial tension between the molten solder and said workpieces and conducting said soldering operation in the absence of a flux and under an inert solder blanketing gas or a low vacuum.

17. The method as defined in claim 1 wherein said substance is bismuth.

18. The method as defined in claim 1 wherein said inert gas is nitrogen.

* * * * *